United States Patent Office 3,298,857
Patented Jan. 17, 1967

3,298,857
METHOD OF STIFFENING POLYURETHANE FOAMS
Samuel M. Terry, Ann Arbor, Mich., assignor to Hoover Ball and Bearing Company, Saline, Mich., a corporation of Michigan
No Drawing. Filed Nov. 30, 1964, Ser. No. 414,868
15 Claims. (Cl. 117—98)

The present invention relates to methods of stiffening polyurenthane foams and to methods of producing polyurethane foams of enhanced stiffness.

Broadly speaking, a polyurethanne foam is the reaction product of a polyfunctional reactive hydrogen compound with an organic polyisocyanate, the polyfunctional compound containing active hydrogens which react with isocyanato groups. In the course of producing such foams, it is conventional to include a small proportion of water in the formulation, the water reacting with the isocyanate group to produce an amine and carbon dioxide. The release of carbon dioxide internally of the reaction mass causes the reaction mass to form. Appropriate catalysts can be used to regulate both the water-isocyanate reaction to control the speed of foam formation, and also to control the active hydrogen-isocyanato reaction so as to control the rate of gelation. A desired balance is struck between these two reaction rates, so that a foam having the desired characteristics is produced.

For certain applications, it is desirable to produce a foam which has a relatively low proportion of closed cells. In order to do this, the gelatin rate is carefully controlled so as not to be excessive relative to the foaming rate, to the end that the foam bubbles will have time to form and break, leaving an openwork lattice in the form of a three-dimensional reticulation. On the other hand, the foaming reaction must not proceed so rapidly relative to the gelation reaction that the foam forms and collapses before it has sufficient early or "green" strength to establish a self-supporting lattice.

Open lattice work polyurethane foams, characterized by a relatively small proportion of closed cells, have a number of uses. They are particularly useful as filters for the filtration of fluids such as gases, fuels and lubricating oils, for safety padding, for protective packaging, and for the production of seat cushions and the like, and also for other applications associated with insulation against heat, sound and/or mechanical shock. In addition to the obvious utility of an openwork lattice as a filter, as compared to a foam characterized by a large proportion of closed cells, such an openwork lattice is also desirable by virtue of its great resilience. By contrast, a foam characterized by a relatively high proportion of closed cells tends to have much less resilience and in fact tends to have a "dead" feeling.

Unfortunately, the desirable properties of an openwork lattice-type foam are bought at the cost of strength and stiffness. Such open foams tend to be quite flexible. For many applications, however, greater stiffness is needed than is provided by such a readily flexible foam; but at the same time, a high proportion of closed cells cannot be tolerated.

Various efforts have been made to solve this dilemma. A very common method of increasing stiffness is to advance the gelation rate relative to the foaming rate. But as was pointed out above, this merely results in a higher proportion of closed cells.

Another known method for increasing the stiffness of polyurethane foams is to increase the proportion of polyisocyanate relative to the other reagents. However, a large excess of polyisocyanate not only results in closed cells, but also retards the curing and causes such a condition in the foam that the forming gas bubbles tend to break with explosive force; and this in turn initiates lines of rupture throughout the mass of foam, which show up as splits in the finished product.

Although these and many other attempts have been made to solve this and related problems in this field, none, as far as is known, has been entirely successful when carried out commercially on an industrial scale.

Accordingly, it is an object of the present invention to provide methods for making polyurethane foams which are characterized by a highly open structure but at the same time a desirably high degree of stiffness and tensile strength.

Another object of the present invention is to provide methods for producing polyurethane foams of sufficient open structure to permit use in gas filtration but with sufficient stiffness to resist deformation under the passage of dirt-laden gases therethrough at high velocities.

Still another object of the present invention is the provision of polyurethanne foams having sufficient open structure to permit filtration of liquids at high flow rates, but at the same time sufficient rigidity and heat resistance to resist deformation under the flow of hot liquids.

It is also an object of the present invention to provide polyurethane foams having high load-bearing capacity and high energy absorption but characterized by substantially complete recovery after severe deformation, for use in safety padding and protective packaging.

The invention also contemplates the provision of methods for producing polyurethane foams having various stiffnesses in various portions of the body of foam, for use in applications such as seating or other padding where portions of different stiffness may be required in a single product.

Finally, it is an object of the present invention to provide methods for stiffening polyurethane foams and for producing polyurethane foams of enhanced stiffness, which will be relatively simple, safe, inexpensive and dependable to practice.

Other objects and advantages of the present invention will become apparent from a consideration of the following description.

Briefly, the present invention is the discovery that a foam with a desirable degree of openness and at the same time a desirable degree of stiffness can be produced, if a formed polyurethane foam product of the reaction of a polyfunctional reactive hydrogen compound and a polyisocyanate, in which preferably all the active hydrogen of the polyfunctional compound is reacted, is exposed to the action of an organic polyisocyanate. In other words, the foam is, preferably, first formed with a stoichiometric or excess quantity of polyisocyanate, and then, when hardened to the point that it is self-supporting and resilient, it is treated with organic polyisocyanate in fluid phase, the organic polyisocyanate being caused to permeate throughout the body of foam in the case of a fully stiffened product, or to permeate only a portion of the body of foam in the case of a product having different stiffnesses in different portions thereof.

Any organic polyisocyanate may be used for the post-treatment or stiffening treatment following formation of the foam. The latter polyisocyanate may be applied in vapor phase or in liquid phase. If in vapor phase, it may be applied as a pure vapor or as a vapor with an inert diluent such as nitrogen. Application in liquid phase is preferred. In liquid phase, the polyisocyanate may be applied in pure form, but is preferably applied in solution in a nonaqueous solvent, preferably an organic solvent which is nonreactive with the polyisocyanate. The preferred solvents are selected from the class consisting of dimethyl sulfoxide and solvents having a solubility parameter of about 8–10, more preferably about 8.2–9.8, most preferably about 8.4–9.6.

In greater detail, the polyfunctional reactive hydrogen compounds capable of forming polyurethanes are characterized by having free reactive hydrogen-containing groups such as amino, hydroxy, mercapto or thiohydroxy, or carboxy, which will react with isocyanate. The compounds may include polyesters, polyamides, and polyols, that is, aliphatic compounds having a plurality of hydroxyl groups and including alkylene glycols and polyethers such as poly(oxyethylene) glycols, poly(oxypropylene) glycols, and other poly(oxyalkylene) glycols. Polythioethers are suitable. In general, any organic compound containing at least two reactive hydrogen-containing radicals may be employed. These reactive hydrogens are referred to herein as "active hydrogen."

Polyester derivatives include those obtained by condensing any polybasic, preferably dibasic, carboxylic organic acid, with a glycol. Illustrative acids are adipic, sebacic, 6-amino-caproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc. Suitable glycols include ethylene glycol; propanediol-1,2; propanediol-1,3; butanediol-1,2; butanediol-2,3; butanediol-1,3; butanediol-1,4; methylpropanediol; pentanediol-1,5; pentanediol-2,3; pentanediol-1,4; pentanediol-1,2; the methylbutanediols having the hydroxy groups in the 1,2, and 2,3, and the 1,3 position; 2-methyl-pentanediol-2,4; hexanediol-2,5; heptanediol-1,7; heptanediol-2,4; 2-ethyl-hexanediol-1,3, etc. Also diethylene glycol; triethylene glycol; pentaglycol; glycerol; sorbitol; triethanolamine; and di-(beta-hydroxyethyl) ether. The acid may also be condensed with amino-alcohols such as ethanolamine; di- and triethanolamines; 3-amino-propanol; 4-amino-propanol; 5-aminopentanol-1; 6-aminohexanol; 10-aminodecanol; 6-amino-5-methylhexanol-1; p-hydroxymethyl-benzylamine, etc. Polyesteramides may be obtained by condensing the acid with amines like ethylene diamine; hexamethylene diamine; 3-methylhexamethylene diamine; decamethylene diamine; m-phenylenediamine; etc. The acid may be condensed with a mixture of the foregoing glycols, and/or amino-alcohols and/or amines to produce other suitable polyfunctional compounds. In the esterification, the acid per se may be used for condensation or, where desirable, equivalent components, such as the acid halide or anhydride may be used.

Molecular weights of the polyesters and polyesteramides may range, for example, from 600 to 5000, but usually are not over 2500 and preferably are in the range of 600 or 70 to 20 or 2200. The materials may, for example, have 2 to 10 reactive end groups per molecule. They should be normally liquid materials, that is, liquid at room temperatures, but normally solid materials are suitable if they have a melting point below about 65° C.

The poly(oxyethylene) glycols, poly(oxypropylene) glycols, and poly(oxyalkylene) glycols are sometimes referred to as polyethers, and as glycol polymers; they are characterized by having numerous ether linkages and two terminal hydroxyl groups. They are obtainable by procedures such as are disclosed in U.S. Patents 1,921,378, 1,976,678, and 2,425,845.

The poly(oxyethylene) glycols, sometimes designated "polyethylene glycols" and polyethylene ether glycols, may be defined by the formula:

The molecular weight may range, for example, from 200 to 6000, preferably 500 to 1500.

The poly(oxypropylene) glycols may be represented by the formula $HOCH(CH_3)CH_2O[CH_2CH(CH_3)O]_nH$. The molecular weight may be up to about 15000, preferably in the range of 750 to 4500. They are also designated "polypropylene glycols" and as polypropylene ether glycols.

The poly(oxyalkylene) glycols, also termed "polyalkylene glycols" and polyalkylene ether glycols, have an average molecular weight of up to about 15,000, but the preferred molecular weight range is 750 to 4500. These materials contain recurring oxyalkylene groups, preferably both oxyethylene and oxypropylene groups.

Polyesters are also obtainable by esterifying the poly(oxyethylene), poly(oxypropylene), or poly(oxyalkylene) glycols.

The alkylene glycols may be any of the simple glycols noted above.

Other polyethers are poly(oxybutylene) glycol and polyepichlorohydrin. Still others are polythioethers, which are materials similar to the poly(oxyethylene) glycols, poly(oxypropylene) glycols, etc. except that a sulfur atom replaces the oxygen atom in the oxyethylene, oxypropylene, etc. group.

Other polyfunctional compounds include castor oil and drying oils.

The preferred polyfunctional compound are the polyesters and polyethers, either linear or branched, having a molecular weight, for example, in the range of 700 to 5000 and modified to have, for example, 2 to 10 reactive end groups per molecule. Specific examples of polyesters are polyethylene adipates, polyethylene sebacates, polydiethylene adipates, polypropylene adipates, polyneopentyl adipates, etc. Specific examples of polyethers are polyethylene ether glycol, polypropylene ether glycol, polyethylene thioether glycol, polybutylene ether glycol, polyepichlorohydrin; also intermolecular and intramolecular mixtures thereof; and polyfunctional hydroxyl-terminated adducts of diamines and polyols with these polyethers.

The organic polyisocyanates include ethylene diisocyanate; ethylidene diisocyanate; propylene-1,2-diisocyanate; butylene-1,3-diisocyanate; hexylene-1,6-diisocyanate; cycloxylene-1,2-diisocyanate; m-phenylene diisocyanate; 2,4-tolylene diisocyanate; 2,6-tolylene diisocyanate; toluene triisocyanate; 3,3'-dimethyl-4,4'-biphenylene diisocyanate; 3,3'-diphenyl-4,4'-biphenylene diisocyanate; 4,4'-biphenylene diisocyanate; 3,3'-dichloro-4,4'-biphenylene diisocyanate; triphenylmethane triisocyanate; 1,5-naphthalene diisocyanate; diphenyl ether triisocyanate; polyphenyl ether polyisocyanate; etc. Polyisothiocyanates also can be used with success.

In the case of the polyols, a factor influencing their selection is their hydroxyl number. The higher the hydroxyl number, the greater is the tendency to form closed cells. Above a hydroxyl number of about 400, the foams tend to be quite rigid and be comprised almost entirely of closed cells in their finally formed condition. In an intermediate zone of hydroxyl numbers, from about 70 to about 400, the cells tend to be closed as they form but shrink and collapse upon cooling. This region is undesirable for purposes of the present invention, as the shrinking of the cells upon cooling tends to distort the foam. Therefore, although polyols that are at least difunctional and that have hydroxyl numbers less than about 70 are suitable for use in the present invention, it is preferred that the hydroxyl number range be about 20–65.

There are various ways in which foaming is induced in the formation of polyurethane foams. Among these are the use of mechanical agitation to entrain a gas such as air in the reaction mixture, and the admixture of low boiling liquids such as Freons, that boil under the influence of the exothermic cross-linking reactions. Perhaps the most common foam forming mechanism, and the one that is used in the present invention, is the reaction of the isocyanate groups with water. This reaction proceeds very rapidly, and results in the production of amines and carbon dioxide, the carbon dioxide being the foam-forming gas. The amines, in turn, immediately react with further isocyanate to form compounds having urea-type linkages. These rapid reactions originating with the water-isocyanate reaction give high "green" or early strength to the foam and are quite important in the production of foams according to the present invention characterized by a high proportion of open cells coupled with a desirably high degree of stiffness. Auxiliary foam forming systems such as the low boiling Freons can be used in addition to but not instead of the water-isocyanate foam forming reaction of the present invention.

It is ordinarily desirable to use a catalyst to promote and to regulate the foam forming reaction, and to balance the speed of the water-isocyanate reaction and its subsidiary amine-isocyanate reaction, against the speed of the isocyanate-active hydrogen reaction. Catalysts useful in this connection, among many others, include tertiary amines and organotins. Among the tertiary amines are are N-ethylmorpholine, diazobicyclooctane, diethylcyclohexylamine, etc. Among the preferable organotins are stannous octoate, stannous oleate, dibutyltin dilaurate, etc.

It is also desirable to use an antioxidant in the formulation of the foam. Among these are 2,2'-methylenebis(4-methyl-6-tertiary-butyl phenol) and various alkylated phenols. The phenolic derivatives seem to work by a unique mechanism. Although they contain hydroxyl groups capable of reacting with diisocyanates, the reaction is reversed at elevated temperatures, such as are encountered in processing the foam. In the process following expansion and gelling, when the temperature becomes high, the concentration of polyisocyanate in the foam system becomes very low, so that the equilibrium of the reversible reaction is shifted to release the reactants. The released polyisocyanate can react with some other appropriate group, while the phenol derivative is left free to carry out its antioxidant function.

The foam forming reaction can be conducted in any of the conventional sequences of operation. Thus, it may be conducted according to a "one-shot" method, in which the reactants are mixed substantially simultaneusly with the initiation of foaming; or it can be conducted according to a prepolymer method. As is well known in this art, the prepolymers from which polyurethane foams are sometimes formed are adducts characterized by a substantial excess of polyisocyanate, which therefore have free isocyanato groups. The prepolymer can react with water and catalyst; but the reaction of forming urethane linkages is already so advanced in the case of a prepolymer that the cells that are formed upon foaming tend to be largely closed. To open the cells, it is common practice to run the formed foam through crushing rolls. Provided the crushing operation is conducted while the foam is still relatively "green," the foam will thereafter recover most of the strength which was lost in crushing.

As was stated above, all organic polyisocyanates can be used for the post treatment or stiffening operation, including those listed above. Post treatment is conducted in a water-free environment, as the presence of water at this stage of the operation results in the formation of a powdery deposit on the foam.

Although the reasons why the post treatment with polyisocyanate stiffens the foam are not known with certainty, it is believed that the stiffening may be due to the reaction of the oxygen or the nitrogen of the post treatment isocyanate group with the urethane active hydrogen. The carbon of the entering isocyanate group would thus become bonded to the nitrogen of the existing urethane or urea linkage to form an allophanate or biuret type arrangement, perhaps as follows:

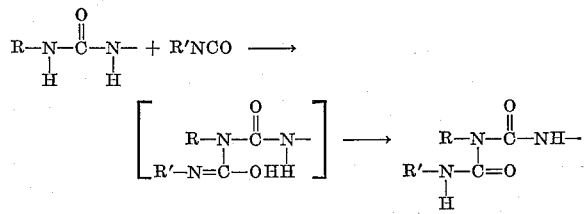

In any event, the post treatment polyisocyanates would thus form further cross linkings that could account for the increased stiffness of the post-treated product, and at the same time could not increase the proportion of closed cells because the cell formation or foaming reaction is complete at the time of post treatment.

To achieve a desirable degree of stiffness, it is desirable that the formation of urethane linkages in the production of the original foam proceed to completion. In the case of urethane-forming materials in the nature of polyols, for example, "completion" means that substantially all of the hydroxyls are saturated or reacted to form urethane-type linkages. This means that the polyisocyanate used during foam formation should be present in excess of that which is stoichiometrically needed in order at least initially to satisfy the polyfunctional material so that the urethane forming reaction proceeds to completeness, and also to react with all the water present.

Although the initial polyisocyante should thus be present during foam formation in excess of 100% of the required amount, it should not be present in great excess for the reasons pointed out above, namely, the retardation of curing, the splitting of the product, and the high proportion of closed cells. Ordinarily, 110% of the required amount, on a mol basis, is the maximum for safety in the case of a molded foam. In the case of the formation of open slab stock, more polyisocyanate, up to about 120% of the mol equivalent, can be used. However, the preferred excess is about 3–5 mol percent, that is, 103–105 mol percent polyisocyanate is used in the initial foam forming reaction, based on the mol equivalence of the polyfunctional material and the foam forming water.

As indicated above, the choice of a solvent can be an important factor in improving the stiffening function of the post treatment of the present invention. Unexpectedly, it has been discovered that certain solvents cause swelling of the foam, and that the effectiveness of the post treatment isocyanate in stiffening or hardening the foam varies as the degree to which its solvent causes the foam to swell.

Again, no reason is known why this should be true. Perhaps the solvent penetrates the foam and enters into the constituent material, as by capillary action or diffusion or osmotic process and absorption, with the possible result that the solvent would tend to push the molecular chains and segments apart and reduce the strength of the electrical attraction between points of high and low electron density on neighboring chains. This could promote the cross linking of the polyisocyanate upon post treatment and cause an increase in the stiffness of the foam as compared to post treatment without the special solvents of the present invention.

Again unexpectedly, it has been fund that for the most part, the effectiveness of a solvent to promote swelling of the foam is related to its solubility parameter. The solubility parameter is a thermodynamic function derivable from the latent molar heat of evaporation of the molar volume of the solvent, according to the relationship $$d = (\Delta H / Vm)^{1/2}$$

Solubility parameter may be obtained quantitatively by multiplying the heat of vaporization in gram calories per gram by the density in grams per cubic centimeter and extracting the square root of the product. A table of solvents with their solubility parameters and the percentage of volume increase they cause upon post treatment of the foam according to the present invention, is given as follows:

| Solvent | Solubility Parameter | Percentage of Volume Increase |
|---|---|---|
| Water | 23.2 | 0.0 |
| Dimethylformamide | 8.73 | 305.0 |
| Isopropyl alcohol | 11.5 | 54.5 |
| n-Butyl amine | 8.8 | 252.0 |
| Dimethyl sulfoxide | 13 | 166.0 |
| Acetone | 10 | 80.9 |
| Methylethylketone | 9.3 | 126.0 |
| Diisobutylketone | 7.8 | 71.9 |
| Benzene | 9.6 | 148 |
| MeCl$_2$ | 9.5 | 160 |
| Chlorobenzene | 8.8 | 130.0 |
| Toluene | 8.9 | 103.0 |
| Turpentine | 8.1 | 76.5 |
| VM&P Naphtha | 7.6 | 38.5 |
| Mineral Spirits | 6.9 | 0.5 |

As will be seen from this table, the preferred range of solubility parameter is about 8–10, more preferably about 8.2–9.8, and most preferably about 8.4–9.6.

Dimethyl sulfoxide is the anomalous case, as its solubility parameter lies outside the preferred range. It may be that there is a reaction between the foam and the dimethyl sulfoxide, or at least a very strong tendency to form hydrogen bonds, perhaps as follows:

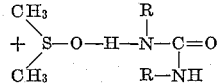

When a solvent is used in the post treatment, the concentration of the polyisocyanate in the solvent is not at all critical. At the one extreme, any amount of solvent, no matter how small, will have a beneficial effect if included with the polyisocyanate; at the other extreme, even a very dilute solution of polyisocyanate is operative and gives improved results.

To enable those skilled in this art to practice the invention, the following illustrative examples are given:

Example I

A polyurethane foam is formed from the following components, which are given in parts by weight:

| | |
|---|---|
| Poly(oxypropylene) triol of 3000 molecular weight | 100.0 |
| Copolymer of propylene oxide and dimethyl siloxane | 1.0 |
| Diazobicyclooctane | 0.1 |
| Stannous octoate | 0.075 |
| 2,2'-methylene bis(4-methyl-6-tertiary-butyl phenol) | 1.0 |
| Water | 3.2 |
| Tolylene diisocyanate, 80:20 mixture of the 2,4 and 2,6 isomers | 45.0 |

A "one-shot" foam preparation procedure was followed in which all the ingredients but the diisocyanate were preblended to form a mixture of limited stability. The mixture and the diisocyanate were then mixed in an open top mold at room temperature and left for 24 hours.

The block thus produced was discharged from the mold and was found to be self-supporting and resilient and immune from damage or substantial loss of recovery upon severe deformation. The block was then immersed in a solution of 5% by weight of tolylene diisocyanate in methylene chloride. The block was compressed twice to about 10% of its initial thickness and permitted fully to recover after each compression, while immersed in the solution, whereby the solution was thoroughly imbibed throughout the mass of the foam. Thereafter, the foam was drained with squeezing and was dried in an oven at 100° C. in an atmosphere of dry nitrogen.

The density of the block was found to have increased from 2.0 lbs./cu. ft. prior to post treatment with the solution in methyl chloride, to a density of 2.73 lbs./cu. ft. after drying. The increase in weight is taken to be the added polyisocyanate.

The load necessary to give 10% deflection, in pounds per square inch, increased from 0.5 p.s.i. after discharge of the formed foam from the mold, to 7.0 p.s.i. after the final drying.

Example II

Example I was repeated, but the foam was post treated with a solution of 5% tolylene diisocyanate by weight in mineral spirits. The density increased to 2.2 lbs./cu. ft. and the load to give 10% deflection increased from an untreated 0.5 p.s.i. to 3.25 p.s.i.

Example III

Example II was repeated, but instead of a 5% solution, a 20% by weight solution of tolylene diisocyanate in mineral spirits was used. The density of the block was raised to 2.65 lbs./cu. ft., and the load to give 10% deflection was raised from 0.5 p.s.i. for the untreated block, to 6.0 p.s.i. for the treated block.

Example IV

To illustrate treatment of bodies of foam over only a portion of their extent, two molded seat cushions were prepared according to Example I; but one was post treated with polyisocyanate, as in Example I, and the other was not. The one that was treated was coated on the bottom side (which is the side adjacent the spring assembly in the trimmed seat) with a 5% solution of tolylene diisocyanate in methylene chloride by brushing on 50 grams of the solution per square foot of surface area. The treated region of the post-treated cushion had substantially greater stiffness than the untreated region thereof. The indent-load-deflection was measured in accordance with ASTM procedure D1564–63T after treatment and drying followed by a 24 hour conditioning period to attain ambient conditions. The load-deflection characteristics of the treated and the untreated cushion are given as follows:

| Deflection | Untreated Cushion, lbs./50 sq. in. | Treated Cushion, lbs./50 sq. in. |
|---|---|---|
| 25% | 17.0 | 18.0 |
| 50% | 29.2 | 35.8 |
| 65% | 46.1 | 63.0 |
| 25% return | 11.3 | 12.4 |
| Sample thickness, inches | 1.709 | 1.700 |

From a consideration of the foregoing disclosure, it will be evident that all of the initially recited objects of the present invention have been achieved.

Although the present invention has been described in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. A method of increasing the stiffness of a formed open cell polyurethane foam product of the reaction of a polyfunctional reactive hydrogen compound and an organic polyisocyanate, comprising exposing such a formed foam to the action of an organic polyisocyanate.

2. A method as claimed in claim 1, in which said last named polyisocyanate is dissolved in a solvent.

3. A method as claimed in claim 2, said solvent being selected from the class consisting of dimethyl sulfoxide and solvents having a solubility parameter of about 8–10.

4. A method as claimed in claim 2, said solvent having a solubility parameter of about 8.2–9.8.

5. A method as claimed in claim 2, said solvent having a solubility parameter of about 8.4–9.6.

6. A method as claimed in claim 1, in which only a portion of said formed foam is exposed to the last-named polyisocyanate, thereby to produce a product having regions of different stiffness.

7. A method of producing an open cell polyurethane foam product of increased stiffness wherein the foam product is formed by reacting an organic polyisocyanate with a polyfunctional reactive hydrogen compound and water with the polyisocyanate present in excess of that required to react with the active hydrogen and water, thereby to produce a formed foam product free from said active hydrogen of said polyfunctional compound, comprising exposing the formed foam in a substantially water-free environment to the action of an organic polyisocyanate.

8. A method as claimed in claim 7, in which said last named polyisocyanate is dissolved in a solvent.

9. A method as claimed in claim 8, said solvent being selected from the class consisting of dimethyl sulfoxide and solvents having a solubility parameter of about 8–10.

10. A method as claimed in claim 8, said solvent having a solubility parameter of about 8.2–9.8.

11. A method as claimed in claim 8, said solvent having a solubility parameter of about 8.4–9.6.

12. A method as claimed in claim 7, in which only a portion of the formed foam is exposed to the last-named polyisocyanate, thereby to produce a product having regions of different stiffness.

13. A method as claimed in claim 7, in which said polyfunctional compound is a polyol having a hydroxyl number no more than about 65.

14. A method as claimed in claim 13, said hydroxyl number being no less than about 20.

15. A method as claimed in claim 7, said excess being about 3–5 mol percent.

References Cited by the Examiner
UNITED STATES PATENTS

2,921,866   1/1960   Wilson _____ 117—98

LEON J. BERCOVITZ, *Primary Examiner.*

DONALD E. CZAJA, *Examiner.*